US008135946B2

(12) United States Patent
Juen et al.

(10) Patent No.: US 8,135,946 B2

(45) Date of Patent: Mar. 13, 2012

(54) METHOD FOR PROGRAMMING AN OPERATING DEVICE FOR LIGHTING MEANS

(75) Inventors: Reinhold Juen, Dornbirn (AT); Dietmar Klien, Mäder (AT); Carsten Strietzel, Feldkirch (AT)

(73) Assignee: TridonicActo GmbH & Co KG, Dornbirn (AT)

( * ) Notice: Subject to any disclaimer, the term of this patent is extended or adjusted under 35 U.S.C. 154(b) by 583 days.

(21) Appl. No.: 11/764,318

(22) Filed: Jun. 18, 2007

(65) Prior Publication Data

US 2007/0268151 A1    Nov. 22, 2007

Related U.S. Application Data

(63) Continuation of application No. PCT/EP2005/013734, filed on Dec. 20, 2005.

(30) Foreign Application Priority Data

Dec. 20, 2004 (DE) ........................ 10 2004 061 294

(51) Int. Cl.
*G06F 15/177* (2006.01)

(52) U.S. Cl. ........................................ 713/100; 713/1

(58) Field of Classification Search ........................ None
See application file for complete search history.

(56) References Cited

U.S. PATENT DOCUMENTS

| | | | | |
|---|---|---|---|---|
| 5,579,522 | A * | 11/1996 | Christeson et al. | 713/2 |
| 6,798,341 | B1 * | 9/2004 | Eckel et al. | 340/521 |
| 2002/0073304 | A1 * | 6/2002 | Marsh et al. | 713/1 |
| 2002/0158591 | A1 * | 10/2002 | Ribarich et al. | 315/291 |
| 2002/0166027 | A1 * | 11/2002 | Shirasawa et al. | 711/114 |
| 2003/0222603 | A1 * | 12/2003 | Mogilner et al. | 315/294 |
| 2004/0217717 | A1 | 11/2004 | Breuer et al. | 315/291 |
| 2004/0217718 | A1 * | 11/2004 | Kumar et al. | 315/291 |
| 2005/0156534 | A1 * | 7/2005 | Oh | 315/247 |
| 2006/0044152 | A1 * | 3/2006 | Wang | 340/825 |
| 2006/0101111 | A1 * | 5/2006 | Bouse et al. | 709/200 |
| 2006/0132065 | A1 * | 6/2006 | Sears et al. | 315/312 |

FOREIGN PATENT DOCUMENTS

EP 1 422 975 A1 5/2004

OTHER PUBLICATIONS

C. Contenti, XP-010583030, "Digitally Addressable DALI Dimming Ballast", IEEE, vol. 2, pp. 936-942 (2002).

* cited by examiner

*Primary Examiner* — Dennis M Butler

(74) *Attorney, Agent, or Firm* — Winston & Strawn LLP

(57) ABSTRACT

The invention relates to a method for programming an operating device for lighting, wherein the operating device comprises firmware and an interface for receiving external control commands for operating the lighting. This method includes at least partially programming the firmware of the operating device or the interface by transmitting additional information to the interface. This can conveniently be accomplished while the operating device is in operation. Typical lighting of the invention is the type that includes an electronic ballast for gas discharge lamps.

16 Claims, 1 Drawing Sheet

METHOD FOR PROGRAMMING AN OPERATING DEVICE FOR LIGHTING MEANS

CROSS-REFERENCE TO RELATED APPLICATIONS

This application is a continuation of International application PCT/EP2005/013734 filed Dec. 20, 2005, the entire content of which is expressly incorporated herein by reference thereto.

BACKGROUND

The present invention relates to a method for programming an operating device for lighting means, in particular for programming an electronic ballast for gas discharge lamps. The present invention also relates to an interface for an operating device for lighting means, the interface being provided for receiving external control commands for operating the lighting means.

The implementation of relatively large illumination systems in which a plurality of lighting fittings are controlled with regard to their operational behaviour from a central control unit has been distinctly simplified by lamp operating devices of the most recent generation. Modern operating devices are in particular capable of receiving external control commands for operating the corresponding lighting means and then appropriately activating the lighting means, in particular also adjusting it in terms of its brightness. The control commands can in this respect be transmitted both via separate data or bus lines or, in connection with the PLC (powerline carrier) method, via the power supply lines. Also known are operating devices for lighting means which comprise an interface for the wireless reception of control commands.

The possibilities for controlling distributed light sources have recently been improved further in particular by the development of the so-called DALI (Digital Addressable Lighting Interface) standard, which represents a digital standard in lighting control and, when compared with the 1-10 volt interface often previously used, offers increased convenience for intelligent lighting control. The DALI standard is a new interface definition which has been developed in particular for electronic ballasts (EBs) for operating gas discharge lamps. Under this standard the operation of EBs can be carried out in digital form with all required functions, in particular with the possibility of activating the ballasts individually or in groups, which is rendered possible by the allocation of corresponding addresses. By transmitting control commands which are defined under the DALI standard, the lamp operating device can then be made to ignite the lamp and to activate it with a certain brightness.

The different commands which are transmitted by a central control unit to the individual operating devices under the DALI standard are processed in the operating devices according to a specific system or program. This program, the so-called firmware, is usually stored in a memory of the lamp operating device and is responsible for duly processing the received commands. The firmware in particular ensures that the control commands received via an interface of the lamp operating device are appropriately transmitted to a control unit of the lamp operating device in order to cause the control unit to activate the light source in the desired manner.

Generally speaking, it must be possible to update or replace the firmware in order to be able to adapt the functionality of the lamp operating device to new developments or special requirements. The overwriting or supplementation of the firmware can open up the possibility, for example, of activating new light sources or being able to process new commands transmitted from a central control unit.

Therefore lamp operating devices or microprocessors are known which work according to the DALI standard and comprise an additional interface via which it is possible to update or generally change the firmware. For example, the firm Motorola sells a microcontroller under the name M68HC08 which comprises a separate programming interface in the form of an individual pin via which the firmware stored in a special memory can be overwritten.

This known solution therefore enables the firmware to be adapted to new requirements or further developments, although in the case of the prior art it is necessary to firstly deactivate the lamp operating device, in particular to disconnect it from the general power supply, before it can be connected to a corresponding programming device. This is complicated and, for example, in the case of lamp operating devices which are located at places which can only be accessed with difficulty, impractical. Thus, improvements in programming of the interface are desired.

SUMMARY OF THE INVENTION

The present invention now presents a novel possibility for programming an operating device for a lighting means. This is achieved by a method for programming an operating device for lighting means, wherein the operating device comprises firmware and an interface for receiving external control commands for operating the lighting means. This method comprises at least partially programming the firmware of the operating device or the interface by transmitting additional information to the interface. Typical lighting means include an electronic ballast for gas discharge lamps.

The interface may, for example, be connected to a bus or, in the form of a PLC interface, to the power supply network for transmitting the data/information, although it would also be conceivable to configure the interface for the wireless reception of external control commands and programming information. Therefore, according to the first aspect of the present invention, the interface, which in normal operation is primarily responsible for receiving the control commands for operating the lighting means, is at the same time used for receiving the information via which the firmware is programmed or updated. Compared with the prior art, the necessity of a separate programming input can in this case be avoided, which also in particular provides the advantage that the operating device does not have to be disconnected from the general illumination system and then connected to a separate programming device in a special way. There would in particular also be the possibility, for example, of the programming being carried out by a central control device which is at the same time also responsible for transmitting the external control commands for operating the lamp.

The firmware can therefore, for example, be programmed directly in a phase during which the lamp operating device is in operation. However programming when the operating device is in a standby state or in a disconnected state would also be conceivable. The command set which the interface uses for communication with the central control unit can then be changed, for example, via the programming. Communication with new users or other devices such as, for example, brightness sensors or the like could also become possible as a result. Moreover, the functionality of the operating device could also be changed through changing the firmware by giving the device new possibilities for activating the corresponding lighting means, for example. Finally, there is the advantage that upon subsequently detecting software errors, for example, the individual devices no longer have to be removed and reprogrammed, as the firmware can now be updated centrally via the bus or the power lines.

This first aspect of the present invention also relates to an interface for a lamp operating device which is provided for receiving external control commands for operating the lighting means and also comprises a writable memory or is connected to a memory in which firmware is stored, the firmware being programmable according to the invention via additional information transmitted to the interface. This aspect also relates to an operating device for lighting means which comprises a correspondingly configured interface.

According to a second aspect of the present invention, an operating device for lighting means, for example an electronic ballast for gas discharge lamps, is proposed which comprises an interface which is accessible from outside and via which the firmware of the operating device and/or the interface can be programmed during operation of the operating device. Therefore, according to the second aspect of the present invention, it is proposed that the firmware be programmed during normal operation of the operating device. The interface which is used to receive this programming information can then—within the meaning of the first aspect of the present invention—either be the interface which is also formed for receiving the external control commands for operating the lighting means, although it could also be a separate interface, in which case the operating device then comprises a further interface which is additionally also configured for receiving control commands. In this respect there are then various possibilities for configuring the different interfaces for wireless reception or for connection to a bus line system which shall be described in greater detail below.

BRIEF DESCRIPTION OF THE DRAWINGS

The invention shall be illustrated in detail in the following on the basis of the accompanying drawings, in which.

DETAILED DESCRIPTION OF THE PREFERRED EMBODIMENTS

Figure 1:
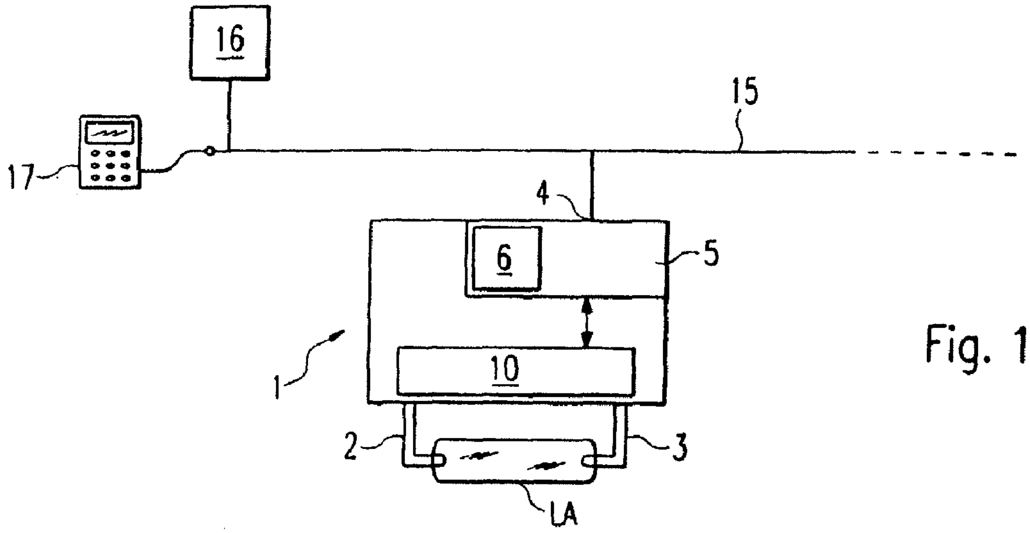
FIG. 1 shows a first embodiment of a lamp operating device according to the invention which is connected to an illumination system.

The lamp operating device which is represented schematically and generally designated by the reference character 1 in FIG. 1 is a component part of a larger illumination system which comprises in particular a plurality of further lamp operating devices (not represented) which are distributed, for example, inside a building or a fixture which is to be illuminated and can be activated from a central control device 16. The control device 16 is disposed, for example, in a central room of the building which is to be illuminated and connected via the lines of a bus line system 15 to the individual lamp operating devices 1. The lamp operating device 1 according to the invention comprises a corresponding connection 4 for connection to the bus line system 15.

There are various possibilities for configuring the bus line system 15, these all of course falling within the concept of the present invention. For example, this may be in the form of separate data lines which are provided solely to transmit the control commands or other information. In this case the lamp operating device 1 is connected via additional connections (not represented) to power supply lines. However another possibility consists in using the lines 15 both to transmit the various data and to supply power. This then takes place by way of a so-called powerline carrier (PLC) method, in which the supply voltage which is applied to the power supply lines is also acted upon by a special data signal which can be detected and evaluated by the lamp operating devices 1. Therefore both separate data lines and, when using a PLC technique, the power supply lines are generally referred to as bus lines in the following. Finally, the data transmission could also take place at least partly in a wireless manner, although this will be illustrated in greater detail at a later point.

The lamp operating device 1 according to the invention also comprises connections 2, 3 for connecting a light source LA which in the represented embodiment is formed by a gas discharge lamp. However here too it is possible for the lamp operating device 1 also to be formed to operate other light sources, e.g. incandescent lamps or semiconductor light sources.

An internal control unit 10 of the lamp operating device 1 is responsible for operating the light source LA, this device activating the light source LA in accordance with predetermined control information. This information is received via an interface 5 which is connected to the bus connection 4 and evaluates external control commands—that is, for example, control commands coming from the central control device 16—received via the bus lines 15 and passes them on to the control unit 10. These control commands can in particular cause the lamp operating device 1 to ignite the gas discharge lamp LA or to adjust or to dim it to a desired brightness.

The operation of the interface 5 as well as of the control unit 10 is in particular controlled by the firmware which is stored inside a memory 6. This memory 6, which in the represented first embodiment is a component part of the interface 5, therefore contains a program whose flow determines the way in which data which are received via the bus connection 4 are subsequently processed by the interface 5 and converted by the control unit 10 for activating the light source LA. For example, this firmware may be configured such that the lamp operating device 1 can be activated by means of digital commands according to the DALI standard.

Since the requirement to change or to expand the functionality of the lamp operating device 1 may arise in the course of time, there must be a possibility of being able to update the firmware which is written into the memory 6.

According to the first embodiment of the present invention, corresponding programming information for updating the firmware can now also be received at the same time via the interface 5, which is actually provided to receive the external control commands for operating the lamp. The bus lines 15 provided for the data transmission or, when using the PLC technique, the power supply lines are therefore also used at the same time if required to transmit the programming information for updating the firmware, in which case this information can in turn be delivered by the central control unit 16 to the bus lines 15, for example. However it would alternately also be conceivable, if required, for a separate programming device 17 to be connected to the bus line system 15 and deliver the corresponding programming information to the bus lines 15.

The solution according to the invention opens up the possibility of being able to update the firmware of the lamp operating device 1 in a simple manner. This updating may in particular also take place when the lamp operating device 1 is activated or connected to the illumination system. However disconnection from the power supply and temporary deactivation of the lamp operating device is no longer imperative according to the present invention.

The range of functions of the lamp operating device 1 can be supplemented or optimised in a simple manner by updating the firmware. For example, this could open up the possibility of the lamp operating device 1 receiving new control commands or the light source LA being activated in a new way. It may also as a result become possible to communicate with other devices which are connected to the illumination system. Thus it would be conceivable, for example, for the updating of the firmware to enable the lamp operating device 1 to appropriately respond to information delivered by a brightness or presence sensor to the bus lines 15.

It is to be noted that the embodiment according to FIG. 1 may of course also comprise the possibility of the firmware only being programmed when the lamp operating device 1 is firstly changed over to a special programming state. However programming during regular operation or in a standby state has the advantage of not necessitating any interruption of the functioning of the illumination system. Updating can instead be carried out at any time.

Figure 2:
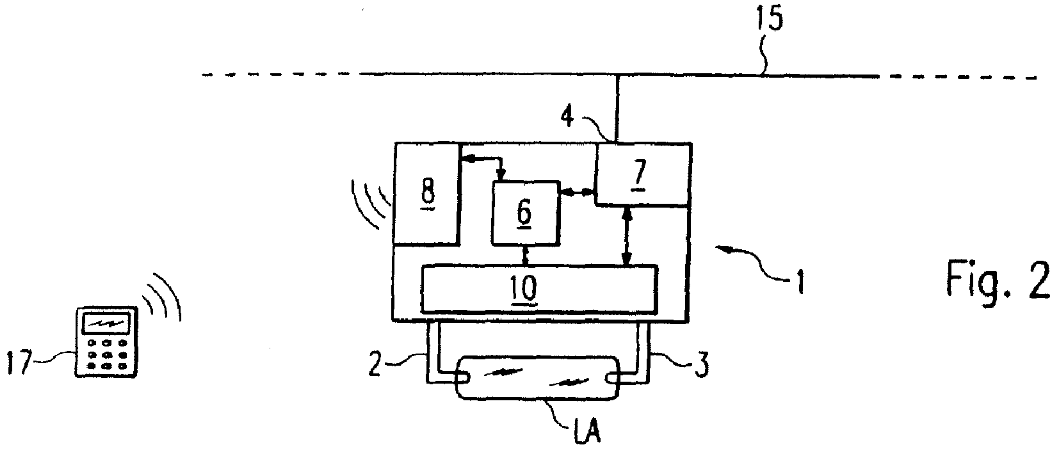
FIG. 2 shows a second embodiment of a lamp operating device according to the invention which is likewise connected to the lines of an illumination system.

In the second embodiment which is represented in FIG. 2 and in which the same components of the lamp operating device 1 are given the same reference characters the lamp operating device 1 is again connected to a bus line system 15 in order to receive from a central control device (not represented) control commands for operating the lighting means LA. Therefore a first interface 7 is again firstly provided, this being connected to a bus input 4 of the lamp operating device 1.

However the firmware which is stored in a memory 6 is now programmed by a separate second interface 8 which is provided solely for receiving the programming information for updating the firmware. This second interface 8 could again be connected to corresponding data lines, although in the represented embodiment the second interface 8 is configured for wireless communication. It would now be possible, for example, to use a portable programming device 17 which communicates via radio or infrared signals with this separate interface 8.

This variant also has the advantage of the possibility of reprogramming the lamp operating device 1 in the installed state and during regular operation or in a standby state without direct access to the device being necessary. This is of particular advantage, for example, when the lamp operating device 1 is mounted at a place which can only be accessed with difficulty, for example at a ceiling of a hall or similar.

It is therefore again possible to update the firmware in the memory 6 in a particularly simple manner and therefore modify the functionality of the lamp operating device 1 as desired. In the represented case the memory 6 is isolated from the different interfaces 7, 8 as well as from the control unit 10, although all the components still have access to the memory 6.

Furthermore, it would also be conceivable in this second embodiment for the second interface, which is provided to transmit the firmware update, to be in the form of a PLC interface. In this case the regular data transmission would take place via the data lines 15 especially provided for this purpose, whereas the power supply network is on the other hand used to transmit the new firmware. The above-mentioned advantages of simple and convenient updating of the firmware are also maintained in this variant.

Figure 3:
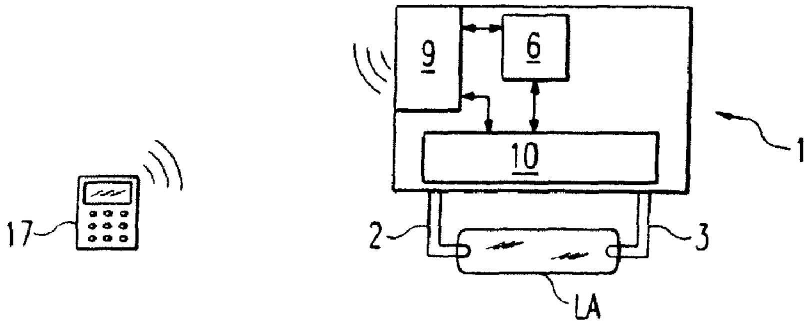
FIG. 3 shows a third embodiment of a lamp operating device according to the invention.

In the third embodiment in FIG. 3 a single interface 9 is again used both for receiving the external control commands and for receiving information which is provided for programming the firmware. However this third embodiment differs in that this interface 9 is configured solely for wireless communication. In this case the lamp operating device 1 need not therefore be connected to the lines of a larger bus line system, but could be disposed as an individual device at any desired place inside a room which is to be illuminated. However simple and convenient updating of the firmware is again made possible by the corresponding information being transmitted by means of a portable programming device 17, for example.

Finally, this embodiment could also comprise the alternative solution of transmitting the data in a wireless manner—as represented—and updating the firmware via a PLC interface.

Therefore, as a whole, the present invention opens up the possibility of updating the firmware of a lamp operating device in a simple manner. When compared with solutions known up to now, the information can be transmitted without a high expenditure, and it is in particular no longer necessary to change the device over to a special programming state or to connect it separately to a corresponding programming device.

What is claimed is:

1. A method for programming an operating device for lighting means that includes a light source, wherein the operating device comprises a bus interface and operating firmware, and the method comprises:

receiving external control commands by the interface for operating the lighting means, wherein said control commands are transmitted to the interface during the operation of the lighting means via the bus interface in order to make the operating device control the lighting means, and receiving additional information via the bus interface for at least partial programming of the firmware or the bus interface wherein a change in the control commands processed by the operating device is effected by the programming, and wherein the partial programming of said additional information is performed during operation of the lighting means.

2. The method of claim 1, wherein the lighting means comprises an electronic ballast for gas discharge lamps.

3. The method of claim 1, wherein the bus is formed by a power supply network and the interface is formed as a PLC interface.

4. The method of claim 1, wherein the interface is configured for wireless reception of the control commands and the programming information.

5. The method of claim 1, wherein the partial programming of said additional information is further performed when the operating device is in a standby state.

6. The method of claim 1, wherein communication with new devices becomes possible through the programming of the firmware.

7. The method of claim 1, wherein programming the firmware changes the functionality of the operating device.

8. The method of claim 1 wherein the partial programming further changes the instruction set used by the bus interface for communication.

9. The method of claim 1 wherein the firmware causes the bus interface to operate according to the DALI standard.

10. An operating device for controlling lighting means that includes a light source comprising:

a memory for storing firmware, wherein the firmware controls the operating device; and a bus interface for receiving control command data, wherein the control command data is transmitted during the operation of the lighting means, and wherein the stored firmware evaluates the received control command data in order to direct the operating device to control the operating device activate the lighting means correspondingly; and for receiving additional information for at least partial programming of firmware or the bus interface wherein a change in the control commands processed by the operating device is effected by the programming, and wherein the programming of said additional information is performed during operation of the lighting means.

11. The operating device of claim 10, which is also configured for receiving external control commands for operating the lighting means.

12. The operating device of claim 10, wherein the bus interface is connected to a bus.

13. The operating device of claim 12, wherein the bus is formed by a power supply network and the interface is formed as a PLC interface.

14. The operating device of claim 10, wherein the bus interface is configured for wireless reception of the control commands and information for programming the firmware.

15. The operating device of claim 11, further comprising an additional interface for receiving external control commands and is connected to a bus, and the interface is configured for wireless reception of the information for programming the firmware.

16. The operating device of claim 10 wherein the firmware causes the bus interface to operate according to the DALI standard.

* * * * *

UNITED STATES PATENT AND TRADEMARK OFFICE

CERTIFICATE OF CORRECTION

PATENT NO. : 8,135,946 B2
APPLICATION NO. : 11/764318
DATED : March 13, 2012
INVENTOR(S) : Juen et al.

It is certified that error appears in the above-identified patent and that said Letters Patent is hereby corrected as shown below:

Column 7:
Line 5, before "firmware", insert -- the --.

Signed and Sealed this
First Day of May, 2012

David J. Kappos
*Director of the United States Patent and Trademark Office*